United States Patent
Leppänen

Patent Number: 5,898,918
Date of Patent: Apr. 27, 1999

[54] METHOD FOR CLASSIFYING CALLS FOR A MOBILE SUBSCRIPTION

[75] Inventor: Osmo Leppänen, Lahti, Finland

[73] Assignee: Sonera Oy, Helsinki, Finland

[21] Appl. No.: 08/727,454

[22] PCT Filed: Apr. 13, 1995

[86] PCT No.: PCT/FI95/00220

§ 371 Date: Oct. 15, 1996

§ 102(e) Date: Oct. 15, 1996

[87] PCT Pub. No.: WO95/28809

PCT Pub. Date: Oct. 26, 1995

[30] Foreign Application Priority Data

Apr. 15, 1994 [FI] Finland ..................................... 941753

[51] Int. Cl.[6] ............................... H04M 3/42; H04Q 7/38
[52] U.S. Cl. .................. 455/414; 455/406; 455/408; 455/445; 379/121; 379/127
[58] Field of Search .................................... 455/405, 406, 455/407, 408, 414, 445, 461, 560; 379/113, 114, 121, 125, 126, 127, 134, 139

[56] References Cited

U.S. PATENT DOCUMENTS

| | | | |
|---|---|---|---|
| 4,555,805 | 11/1985 | Talbot | 455/411 |
| 4,776,004 | 10/1988 | Bauer et al. | 379/127 |
| 5,216,703 | 6/1993 | Roy | 455/560 |
| 5,325,421 | 6/1994 | Hou et al. | 379/67 |
| 5,537,610 | 7/1996 | Mauger et al. | 455/406 |
| 5,625,885 | 4/1997 | Nakazawa et al. | 455/32.1 |
| 5,664,005 | 9/1997 | Emery et al. | 455/422 |
| 5,752,186 | 5/1998 | Malackowski et al. | 455/414 |

*Primary Examiner*—Willis R. Wolfe
*Assistant Examiner*—Hieu T. Vo
*Attorney, Agent, or Firm*—Cohen, Pontani, Lieberman & Pavane

[57] ABSTRACT

A method for classifying calls placed from a mobile station by a subscriber to facilitate creation of an invoice record. When placing a call from the mobile station, the subscriber dials a predetermined prefix associated with a particular invoice code to identify the call as belonging to a particular invoice cost group that corresponds to the invoice code. When the invoice record is generated, all calls for which prefixes were dialed and that were placed by the subscriber from the mobile station, are automatically placed in appropriate invoice cost groups in accordance with the invoice codes of the prefixes.

9 Claims, 1 Drawing Sheet

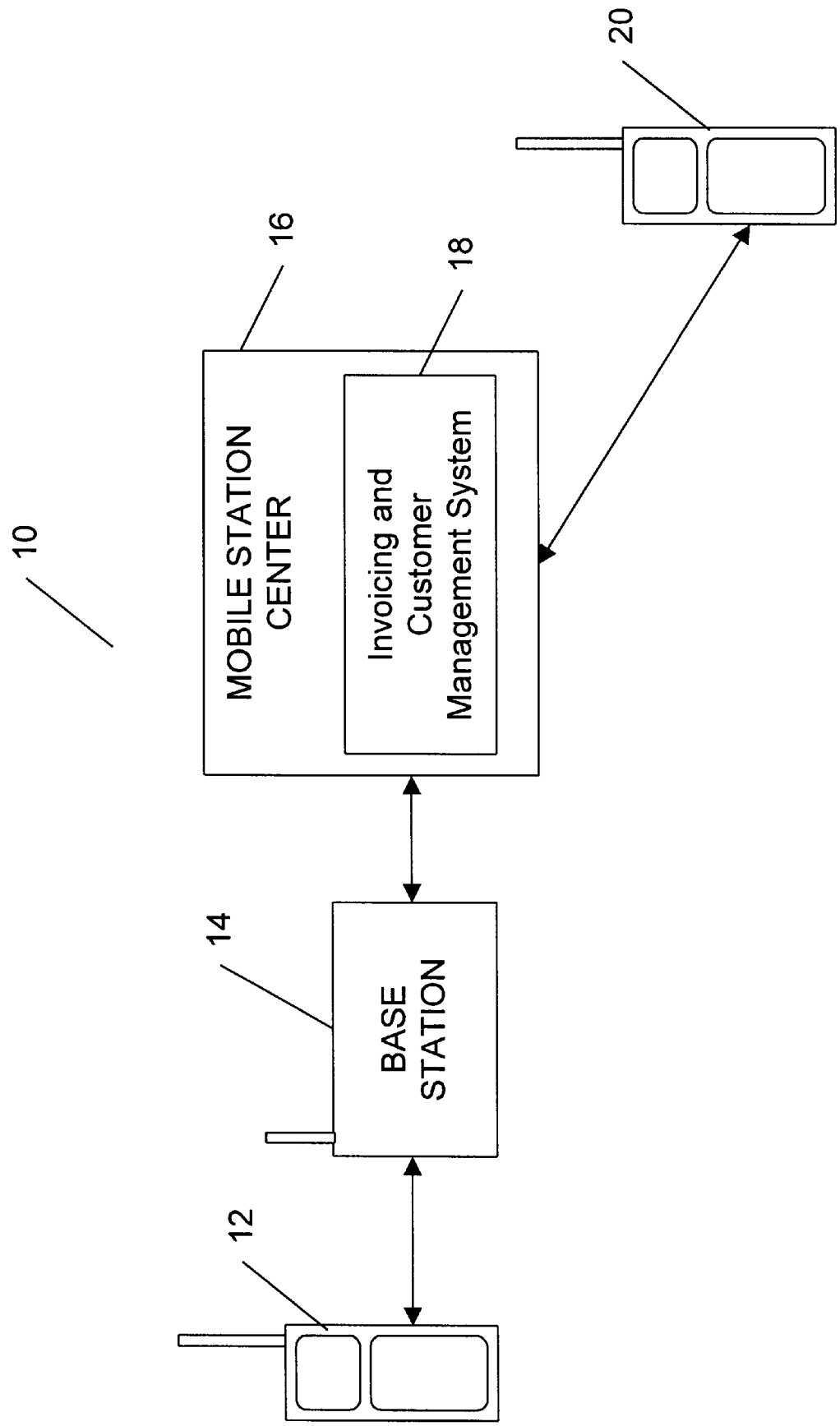

METHOD FOR CLASSIFYING CALLS FOR A MOBILE SUBSCRIPTION

The invention relates to a method for classifying calls from a mobile subscription.

The invoicing system of telephone exchanges marks the selection made by the subscriber as a B-number to the invoicing record of each telephone call. When the selection is predetermined, e.g. a selection beginning with 9, 0 or 1, normal analyses are performed in the exchange and the call is coupled to the receiver and necessary information is marked to the invoicing record, as is well-known.

By the same mobile station are phoned calls of different types, e.g. private or company calls or e.g. calls, that the subscriber would like to group to different cost points. Separation of these calls has not before been possible.

In order to solve this problem a new method has been developed, by which a decisive improvement will be obtained for the above-mentioned problem.

By the invention it is possible to group the calls, phoned from the same mobile station and using the same predetermined prefix, into different cost groups at the invoice by the way selected with the prefix. This enables the separation of the private and company calls phoned from the same telephone exchange. The subscriber can also divide these calls into different cost groups according to his desire, e.g. a consultant, who deals with the affairs of different customers, can directly divide the telephone costs in a customer-related manner.

Referring now to FIG. 1, the present invention provides a method for classification of the calls of a mobile station 12 in a mobile station system 10 comprising mobile stations 12, 20, at least one base station 14 provided with communication via a radio channel to the mobile station and having a limited operational range, at least one mobile station centre 16 equipped for mobile station services and being able to be in interaction with telephone centres or exchanges, in which method a call is made from a predetermined mobile station 12 subscription with an in advance selected beginning (prefix) to another mobile station, in which inter alia the selection is fed to the invoice data.

When a call with a predetermined prefix is dialled from a predetermined mobile station 12 subscription to another station 20, the predetermined beginning (=prefix) is removed in the exchange before the routing and the numbers corresponding the normal selection are sent to other networks and at the same time according to the selection of the predetermined beginning (=prefix) the information concerning the selection or the B-number and the prefix is also fed to the invoicing data. In the invoicing record there is naturally also other information needed for the invoicing of the mobile station 12 subscriber, as the subscriber number, calling time of the telephone etc. By the predetermined prefix of the selection to be removed when the call is coupled in the mobile station centre 16, the predetermined calls of the predetermined mobile station 12 subscription are separated from each other in the invoicing data, or by these prefixes the calls made by the station 12 are separated from the calls, which do not have this prefix, for invoicing.

As a predetermined selection can be chosen a prefix for instance for each system 150 . . . 159, e.g. 800 . . . 809 GSM—(Global System for Mobile Communications) or for example *150 . . . *159 NMT—(Nordic Mobile Telephone) system. These predetermined prefixes separate the selection from the normal number selection.

When subscribers, who do not have any service quality, i.e. the right to use a prefix, utilise it, the calls are directed as normal selections and the invoicing and customer management system 18 is guided to handle these subscriber calls as if they had no prefix. The invoicing and customer management system 18 has a register including the customer data, as the information concerning the right to use the prefix. According to the known protocol the data is verified in the system and the invoicing data is outputted accordingly.

When transfer is made to the intelligent networks (IN), directions are given to the Intelligence Network IN -centre to prevent the calls, by which have been used a predetermined prefix and which have been made by the subscribers, who do not have the right to use the prefix.

According to the invention it is possible to group the phoned calls for example as calls of different enterprises or as private or company calls. By the first part of the number can be referred to private calls, company calls or one or many cost groups wanted by the subscriber.

A further aspect of the invention comprises among other things, that from a predetermined mobile subscription company calls are phoned with the predetermined selection beginning and private calls without the predetermined selection beginning or vice versa.

From the predetermined mobile station 12 subscription a call can be made to the desired subscriber number with the predetermined selection beginning, whereby this call is separated by the number selection beginning from other calls in the invoicing data.

The receiver of the call can be another mobile station 20 sub-ascription or other telephone subscription, e.g. a wire telephone (not shown).

The invoicing and customer management system 18 divides the calls into different cost groups based on the prefixes defined by the subscriber, and outputs to the invoice the calls of each cost group as the total sum or separately, itemised by the services. Thus also private and company calls can be separately counted, when at least before some calls has been used the prefix according to the invention.

I claim:

1. A method for automatically classifying calls, made by a subscriber using a mobile station, in accordance with a plurality of invoice codes, wherein the subscriber places each call to another station by dialing a particular selection number corresponding to the other station, and wherein each call is routed though a mobile station center, the method comprising the steps of:

(a) dialing, by the subscriber, a predetermined prefix prior to dialing the particular selection number for a particular call, said prefix being associated with a particular invoice code of the plurality of invoice codes; and (b) recording, by the mobile station center, invoice data indicative of placement of said particular call in a predefined invoice section stored in the mobile station center that corresponds to said particular invoice code associated with said prefix, so that all calls made by the subscriber for which the predetermined prefix was dialed are thereby automatically classified and recorded in appropriate invoice sections.

2. The method of claim 1, wherein said invoice data comprises the particular selection number.

3. The method of claim 1, wherein said plurality of invoice codes comprise a first invoice code and a second invoice code, wherein said predetermined invoice section comprises a first call invoice section corresponding to said first invoice code and a second call invoice section corresponding to said second invoice code, and wherein said step (b) further comprises the steps of:

(c) determining, in the mobile station center, whether the subscriber dialed said prefix at said step (a), and:
  (1) when the subscriber is determined to have not dialed said prefix at said step (a), recording, in the mobile station center, invoice data for said particular call in a said first call invoice section; and
  (2) when the subscriber is determined to have dialed said prefix at said step (a), recording, in the mobile station center, invoice data for said particular call in a said second call invoice section.

4. The method of claim 3, wherein said first invoice code comprises a personal invoice code, wherein said first invoice section comprises a personal invoice section, wherein said second invoice code comprises a business invoice code, and wherein said second invoice section comprises a business invoice section.

5. The method of claim 1, wherein said plurality of invoice codes comprises at least one of: a personal invoice code, a business invoice code, and an invoice code of at least one particular subscriber.

6. The method of claim 1, wherein a general invoice section for storing unclassified invoice data is provided in said mobile station center, further comprising the steps of:
  (d) prior to said step (a) selectively recording, in the mobile station center, a right of the subscriber to use said predefined prefix when placing calls;
  (e) after said step (a), determining in the mobile station center whether the subscriber has a recorded right to use said predefined prefix, and:
    (1) when the subscriber is determined to have the right to use said predefined prefix, proceeding to said step (b); and
    (2) when the subscriber is determined not to have the right to use said predefined prefix, recording invoice data for said particular call in said general invoice section.

7. The method of claim 1, further comprising the steps of:
  (f) prior to said step (a) selectively recording, in the mobile station center, a right of the subscriber to use said predefined prefix when placing calls; and
  (g) after said step (a), determining in the mobile station center whether the subscriber has a recorded right to use said predefined prefix, and:
    (1) when the subscriber is determined to have the right to use said predefined prefix, proceeding to said step (b); and
    (2) when the subscriber is determined not to have the right to use said predefined prefix, blocking by the mobile station center said particular call from being routed to the other station.

8. The method of claim 1, wherein the other station comprises one of a mobile station and a wire line-based telephone.

9. The method of claim 1, wherein said step (b) further comprises the steps of:
  (h) recording said predetermined prefix along with said invoice data; and
  (i) routing, by said mobile station center, said particular call to the other station using only the particular selection number.

* * * * *